(12) United States Patent
Liang et al.

(10) Patent No.: US 12,381,211 B2
(45) Date of Patent: *Aug. 5, 2025

(54) SILICON-OXYGEN COMPOUND, SECONDARY BATTERY USING IT, AND RELATED BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Chengdu Liang, Ningde (CN); Yingjie Guan, Ningde (CN); Yuzhen Zhao, Ningde (CN); Yan Wen, Ningde (CN); Qisen Huang, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 59 days.

This patent is subject to a terminal disclaimer.

(21) Appl. No.: 18/051,519

(22) Filed: Nov. 1, 2022

(65) Prior Publication Data

US 2023/0119054 A1    Apr. 20, 2023

Related U.S. Application Data

(63) Continuation of application No. 17/059,423, filed as application No. PCT/CN2020/103488 on Jul. 22, 2020, now Pat. No. 11,522,181.

(30) Foreign Application Priority Data

Jul. 29, 2019    (CN) .......................... 201910688521.3

(51) Int. Cl.
   *H01M 4/48*       (2010.01)
   *H01M 4/485*     (2010.01)
   (Continued)

(52) U.S. Cl.
   CPC .......... *H01M 4/485* (2013.01); *H01M 4/625* (2013.01); *H01M 2004/021* (2013.01); *H01M 2004/027* (2013.01); *H01M 2004/028* (2013.01)

(58) Field of Classification Search
   CPC ................. H01M 4/485; H01M 4/625; H01M 2004/021; H01M 2004/027;
   (Continued)

(56) References Cited

U.S. PATENT DOCUMENTS

| 2010/0209328 | A1  | 8/2010 | Bi et al. |
| 2011/0097627 | A1* | 4/2011 | Watanabe ............... H01M 4/38 252/182.1 |

FOREIGN PATENT DOCUMENTS

| CN | 100474667 C | 4/2009 |
| CN | 103647056 A | 3/2014 |

(Continued)

OTHER PUBLICATIONS

Machine translation of JP 2013-008696, retrieved from <www.espacenet.com> on Feb. 20, 2024. (Year: 2024).*

(Continued)

*Primary Examiner* — Cynthia K Walls (57) ABSTRACT

The present application provide a silicon-oxygen compound, a secondary battery using it, and related battery modules, battery packs, and devices. The silicon-oxygen compound provided by the present application has a formula of $SiO_x$, in which x satisfies $0<x<2$. The silicon-oxygen compound contains both sulfur and aluminum element, and the sulfur element is present in an amount of 20 ppm~300 ppm. The mass ratio of sulfur element to aluminum element is from 1.5 to 13.0. A secondary battery uses the silicon-oxygen compound provided in the present application, so that the (Continued)

secondary battery can have both long-cycle performance and high initial coulombic efficiency.

16 Claims, 3 Drawing Sheets

(51) Int. Cl.
*H01M 4/62* (2006.01)
*H01M 4/02* (2006.01)

(58) Field of Classification Search
CPC .......... H01M 2004/028; H01M 4/366; H01M 4/483; H01M 10/0525; H01M 4/362; H01M 10/052; Y02E 60/10; C01B 33/181; C01B 33/113; C01P 2002/72; C01P 2004/61; C01P 2006/10; C01P 2006/12; C01P 2006/40; C01P 2006/80; C01P 2006/11
See application file for complete search history.

(56) References Cited

FOREIGN PATENT DOCUMENTS

| CN | 103872303 A | 6/2014 |
|----|-------------|--------|
| CN | 104979538 A | 10/2015 |
| CN | 106654194 A | 5/2017 |
| CN | 103779547 B | 6/2017 |
| CN | 108054366 A | 5/2018 |
| CN | 108963194 A | 12/2018 |
| CN | 109599551 A | 4/2019 |
| EP | 3800711 A1 | 4/2021 |
| JP | 2004071542 A | 3/2004 |
| JP | 2012113933 A | 6/2012 |
| JP | 2013008696 A | 1/2013 |
| JP | 2014086254 A | 5/2014 |
| JP | 2015185446 A | 10/2015 |
| JP | 2017091683 A | 5/2017 |
| TW | 201733190 A | 9/2017 |

OTHER PUBLICATIONS

The first Office Action received in corresponding Chinese Application 201910688521.3.
The extended European search report received in corresponding European Application 20810855.5.
The first Office Action received in corresponding Indian Application 202217003625.
The international search report and written opinion received in corresponding PCT Application PCT/CN2020/103488.
The Non-Final Office Action received in US parent U.S. Appl. No. 17/059,423.
Filippo Fabbri et al., "Origin of the visible emission of black silicon microstructures", published on Applied Physics Letters.
Hyeon-Woo Yang et al., "SiOx as a Potential Anode Material for Li-Ion Batteries: Role of Carbon Coating, Doping, and Structural Modifications", published on http://www.intechopen.com.
Notice of Reasons for Refusal received in corresponding Japanese Application 2022-503822, mailed Jan. 25, 2023.

* cited by examiner

SILICON-OXYGEN COMPOUND, SECONDARY BATTERY USING IT, AND RELATED BATTERY MODULE, BATTERY PACK AND DEVICE

CROSS-REFERENCE TO RELATED APPLICATION

This application is a continuation of U.S. patent application Ser. No. 17/059,423, filed on Jul. 22, 2020, which is a National Stage of International Application No. PCT/CN2020/103488, filed on Jul. 22, 2020, which claims priority to Chinese Patent Application No. CN 201910688521.3, filed on Jul. 29, 2019, both of which are incorporated herein by reference in their entireties.

TECHNICAL FIELD

This application belongs to the technical field of energy storage devices, and specifically relates to a silicon-oxygen compound, secondary battery using it, and related battery module, battery pack and device.

BACKGROUND

With the increasing attention to environmental protection, environmentally friendly secondary batteries are gradually being applied to electric vehicles. Different from secondary batteries used in consumer electronics, power secondary batteries have higher requirements for energy density and cycle life. Compared with traditional carbon materials, silicon-based materials have a high theoretical gram capacity as negative active materials, which is several times greater than that of graphite-based negative active materials. Therefore, the industry expects to use silicon-based materials to increase the energy density of secondary batteries.

SUMMARY

A first aspect of the present application provides a silicon-oxygen compound, wherein the silicon-oxygen compound has a formula of $SiO_x$, in which $0<x<2$, and wherein the silicon-oxygen compound includes both sulfur element and aluminum element, and the content of the sulfur element is 20 ppm~300 ppm; and wherein the mass ratio of the sulfur element to the aluminum element is from 1.5 to 13.0.

It is surprisingly found that the silicon-oxygen compound provided in the first aspect of embodiments of the present application significantly improves the capacity and cycle life of the silicon-oxygen compound, so that the initial coulombic efficiency and cycle performance of the secondary battery using the silicon-oxygen compound are increased.

In some embodiments, the content of the sulfur element is from 30 ppm to 250 ppm. When the content of the sulfur element is within the given range, the initial coulombic efficiency, energy density and cycle life of the battery can be further improved.

In any of the foregoing embodiments, the content of the aluminum element is from 5 ppm to 150 ppm; optionally, the content of the aluminum element is from 10 ppm to 100 ppm. When the content of the aluminum element is within the given range, the energy density and cycle life of the battery can be further improved.

In any of the foregoing embodiments, the mass ratio of the sulfur element to the aluminum element is from 2.0 to 10.0. When the mass ratio of the sulfur element to the aluminum element is within the given range, the energy density and cycle life of the battery can be further improved.

In any of the foregoing embodiments, in the X-ray diffraction pattern of the silicon-oxygen compound,
there is a diffraction peak at a position where the diffraction angle 2θ is 26°-30°, and the full width at half maxima of this diffraction peak is 0.8°-3.2°;
there is a diffraction peak at a position where the diffraction angle 2θ is 46°-50°, and the full width at half maxima of this diffraction peak is 1.0°-4.2°;
there is a diffraction peak at a position where the diffraction angle 2θ is 54°-58°, and the full width at half maxima of this diffraction peak is 0.8°-4.5°.

When the silicon-oxygen compound has a given diffraction peak and a full width at half maxima within a given range, the cycle life of the battery can be further improved.

In any of the above embodiments, the silicon-oxygen compound has a powder volume resistivity under a pressure of 20 MPa of 10 Ω·cm or less. Optionally, the powder volume resistivity is 1 Ω·cm or less. When the powder volume resistivity of the silicon-oxygen compound is within the given range, the barriers to the migration of electrons inside the particles can be reduced and the cycle life of the battery can be increased.

In any of the foregoing embodiments, the silicon-oxygen compound has an average particle size Dv50 of 2 μm-15 μm; optionally, the silicon-oxygen compound has average particle size Dv50 of 3 μm-12 μm. When the average particle size Dv50 of the silicon-oxygen compound is within the given range, the cycle performance, energy density and dynamic performance of the battery can be further improved.

In any of the foregoing embodiments, the silicon-oxygen compound has a specific surface area of $1\ m^2/g$~$7\ m^2/g$; optionally, the specific surface area of the silicon-oxygen compound has a specific surface area of $2\ m^2/g$~$6\ m^2/g$. When the specific surface area of the silicon-oxygen compound is within the given range, the irreversible capacity of the battery can be further reduced, and the cycle performance of the battery can be improved.

In any of the foregoing embodiments, the silicon-oxygen compound has a compacted density of $1.2\ g/cm^3$~$1.7\ g/cm^3$ measured under a pressure of 5 tons (equivalent to 49 KN); optionally, the silicon-oxygen compound has a compacted density of $1.3\ g/cm^3$~$1.6\ g/cm^3$ measured under a pressure of 5 tons (equivalent to 49 KN). When the compacted density of the silicon-oxygen compound is within the given range, the specific capacity and energy density of the battery can be further improved.

In any of the foregoing embodiments, the silicon-oxygen compound has a coating layer on an outer surface, and the coating layer includes one or more of a polymer, a carbon material, a metal material, and a metal compound. When the outer surface of the silicon-oxygen compound in the battery has the coating layer, the cycle life of the battery can be further improved.

A second aspect of the present application provides a secondary battery including the above-mentioned silicon-oxygen compound.

A third aspect of the present application provides a battery module including the above-mentioned secondary battery.

A fourth aspect of the present application provides a battery pack including the above-mentioned battery module.

A fifth aspect of the present application provides a device including at least one of the above-mentioned secondary battery, battery module, or battery pack.

DESCRIPTION OF THE DRAWINGS

Hereinafter, the features, advantages, and technical effects of exemplary embodiments of the present application will be described in detail with reference to the accompanying drawings.

DETAILED DESCRIPTION

The embodiments of the present application will be described in further detail below in conjunction with the accompanying drawings and embodiments. The detailed description and drawings of the following embodiments are used to exemplarily illustrate the principles of the present application, and are not intended to limit the application, that is to say, the present application is not limited to the described embodiments.

In the description of this application, it should be noted that, unless otherwise specified, "plurality" means two or more; the orientation or positional relationship indicated by the terms "upper", "lower", "left", "right", "inner", "outside" is only for the convenience of describing the application and simplifying the description, and does not indicate or imply that the device or element referred to must have a specific orientation, be constructed and operated in a specific orientation, and therefore cannot be understood to limit the present application. In addition, the terms "first", "second", "third", etc. are only used for descriptive purposes, and cannot be understood as indicating or implying relative importance. "Vertical" is not strictly vertical, but within the tolerance range. "Parallel" is not strictly parallel, but within the tolerance range.

The orientation words appearing in the following description are all directions shown in the figure, and do not limit the specific structure of the application. In the description of this application, it should be noted that the terms "installation", "connecting", and "connection" should be understood in a broad sense, unless otherwise clearly defined and limited, for example it can be a fixed connection, a detachable connection, or an integral connection; it can be directly connected or indirectly connected through an intermediate medium. For those of ordinary skill in the art, the specific meanings of the above-mentioned terms in this application can be understood according to specific circumstances.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Furthermore, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

In order to better understand the present application, an embodiment of the present application will be described below with reference to FIG. 1.

Silicon-Oxygen Compound

The silicon-oxygen compound of the present application has a formula of $SiO_x$, in which $0<x<2$; wherein the silicon-oxygen compound comprises both sulfur element and aluminum element, and the content of the sulfur element is 20 ppm~300 ppm, and the mass ratio of the sulfur element to the aluminum element is from 1.5 to 13.0.

In this context, ppm (parts per million) is the parts per million of the mass of the sulfur element or aluminum element relative to the mass of the silicon-oxygen compound.

The addition of sulfur element and aluminum element may improve the solid-phase transport of active ions inside the silicon-oxygen compound particles, and may improve the electronic conductivity of the silicon-oxygen compound particles, and may also buffer the expansion and contraction of the particles, which slows down the breakage of particles, thereby greatly improving the initial coulombic efficiency and cycle performance of the silicon-oxygen compound.

In some embodiments, $SiO_x$ satisfies that x is 2 or less; optionally, $SiO_x$ satisfies that x is 1.5 or less; or optionally, $SiO_x$ satisfies that x is 1.2 or less, which enables the silicon-oxygen compound to have higher capacity performance and higher initial coulombic efficiency. The silicon-oxygen compound satisfies that x is greater than 0; optionally, the silicon-oxygen compound satisfies that x is 0.6 or more; or optionally, the silicon-oxygen compound satisfies that x is 0.9 or more, for example, $0.6 \le x \le 1.5$, or $0.9 \le x \le 1.2$. Based on this, the volume expansion effect of the silicon-oxygen compound can be better reduced, so that the silicon-oxygen compound has high capacity and long cycle life.

In some embodiments, in the silicon-oxygen compound, the upper limit of the content of sulfur element can be selected from any value among 300 ppm, 280 ppm, 260 ppm, 220 ppm, 200 ppm, 180 ppm, 160 ppm, 150 ppm, 130 ppm, 120 ppm, and 100 ppm; the lower limit of the content of sulfur element can be selected from any value among 20 ppm, 25 ppm, 30 ppm, 35 ppm, 40 ppm, 45 ppm, 50 ppm, 55 ppm, 60 ppm, 65 ppm, 70 ppm, 75 ppm, and 80 ppm. That is to say, the content of sulfur element may be a range composed of any of the aforementioned upper and lower limit values. Optionally, the content of the sulfur element is from 50 ppm to 200 ppm; or optionally, the content of the sulfur element is from 50 ppm to 100 ppm.

In view of this, the content of sulfur element is 300 ppm or less, which can prevent the sulfur element from consuming too much active ions, such as lithium ions, so that the silicon-oxygen compound can have high initial coulombic efficiency, gram capacity and energy density; the content of sulfur element is 20 ppm or more, which can make the silicon-oxygen compound have a high solid-phase transmission rate of active ions, and at the same time have sufficient buffering effect during the expansion and contraction of the silicon-oxygen compound, so that the silicon-oxygen compound can have a longer cycle life.

In some embodiments, in the silicon-oxygen compound, the upper limit of the mass ratio of the sulfur element to the aluminum element may be selected from any value among 13.0, 12.5, 12, 11.5, 11.0, 10.5, 10.0, 9.5, 9.0, 8.5, and 8.0. The lower limit of the mass ratio of the sulfur element to the aluminum element can be selected from any value among 1.5, 2.0, 2.5, 3.0, 3.5, 4.0, 4.5, 5.0, 5.5, 6.0, 6.5, 7.0, 7.5, and 8.0. That is to say, the mass ratio of sulfur element to aluminum element can be a range composed of any of the aforementioned upper and lower limit values. Optionally, the mass ratio of the sulfur element to the aluminum element is from 2.0 to 10.0.

In view this, the mass ratio of sulfur element to aluminum element within the above range can better exert the synergistic effect of sulfur element and aluminum element, and can further enable the silicon-oxygen compound to have suitable ion conduction and electron transfer performance, while can also reduce the problem of particle breakage caused by the expansion and contraction of the silicon-oxygen particles, making the negative electrode material comprising the silicon-oxygen of the present application have high gram capacity and long cycle life, and further improving the energy density and cycle performance of the secondary battery.

In some embodiments, in the silicon-oxygen compound, optionally, the content of aluminum element is from 5 ppm to 150 ppm. The upper limit of the content of aluminum element can be selected from any value among 150 ppm, 140 ppm, 130 ppm, 120 ppm, 110 ppm, 100 ppm, 90 ppm, 80 ppm, 70 ppm, 65 ppm, 60 ppm, 55 ppm, and 50 ppm. The lower limit of the content of aluminum element can be selected from any value among 5 ppm, 8 ppm, 10 ppm, 15 ppm, 20 ppm, 25 ppm, 30 ppm, 35 ppm, 40 ppm, and 45 ppm. That is to say, the content of aluminum element can be within a range formed by any combination of the aforementioned upper and lower limit values. Optionally, the content of the aluminum element is from 8 ppm to 100 ppm.

In view of this, the content of aluminum element is 150 ppm or less, which can avoid excessive loss of the gram capacity of the silicon-oxygen compound, so that it is beneficial to making the silicon-oxygen compound have a high gram capacity. The content of the aluminum element is 5 ppm or more, which is beneficial to the electronic conductivity of the silicon-oxygen compound, thereby improving its cycle life.

In some embodiments, optionally, in the X-ray diffraction analysis, the silicon-oxygen compound has a diffraction peak at a position where the diffraction angle 2θ is 26°~30°, and the full width at half maxima of the diffraction peak is 0.8°~3.2°; the silicon-oxygen compound has a diffraction peak at the position where the diffraction angle 2θ is 46°~50°, and the full width at half maxima of the diffraction peak is 1.0°~4.2°; and the silicon-oxygen compound has a diffraction peak at the position where the diffraction angle 2θ is 54°~58°, and the full width at half maxima of the diffraction peak is 0.8°~4.5°.

Here, the full width at half maxima (FWHM), which is also called the full width at half maximum, refers to the width of the peak at half the height of the peak.

In view of this, the silicon-oxygen compound has the above three diffraction peaks and the full width at half maxima is within the given range, indicating that it has better crystallite size and suitable crystallinity, so that the silicon-oxygen compound has higher capacity performance and initial coulombic efficiency, which enables the silicon-oxygen compound material to maintain high structural stability during charge and discharge cycle, and not prone to crack, thereby increasing the cycle life of the battery.

In some embodiments, optionally, the powder volume resistivity of the silicon-oxygen compound under a pressure of 20 MPa is 10 Ω·cm or less; or optionally, the powder volume resistivity of the silicon-oxygen compound under a pressure of 20 MPa is 1 Ω·cm or less.

In view of this, the powder volume resistivity of the silicon-oxygen compound is within the above range, which can reduce the barriers to electron migration inside the particles and is beneficial to improving the dynamic performance of the silicon-oxygen compound and to reducing the polarization of the negative electrode, thereby improving the cycle life of the secondary battery. The powder volume resistivity can be adjusted by adjusting the content of the sulfur element and the aluminum element, and the surface treatment of the silicon-oxygen compound can be used to further reduce the powder volume resistivity.

In some embodiments, optionally, the outer surface of the silicon-oxygen compound has a coating layer, and the coating layer may co a polymer, a carbon material, a metal material, and a metal compound. For example, the coating layer comprises one or more of a polymer coating layer, a carbon coating layer, and a metal compound coating layer.

Optionally, the polymer may be selected from one or more of polyaniline, polyacetylene, polystyrene, polyacrylonitrile, polyvinyl chloride and polyethylene.

Optionally, the carbon material may comprise one or more of graphite, mesophase carbon microspheres (MCMB), carbon from hydrocarbon pyrolysis, hard carbon, and soft carbon. The graphite may be one or more of natural graphite and artificial graphite.

Optionally, the metal compound may comprise one or more of $Ti_5Si_3$, $Al_2O_3$, and $TiO_2$.

Based on this, the coating layer can further alleviate the volume expansion effect of the silicon-oxygen compound and can increase the cycle life of the silicon-oxygen compound. At the same time, the coating layer also protects the silicon-oxygen compound, inhibits the side reaction of the electrolyte on the surface of the silicon-oxygen compound, and protects the surface of the silicon-oxygen compound from being corroded by the electrolyte, so that the cycle life of the secondary battery using it is further improved.

In some embodiments, optionally, the average particle size Dv50 of the silicon-oxygen compound is $2\ \mu m \leq Dv50 \leq 15\ \mu m$; or optionally, the average particle size Dv50 of the silicon-oxygen compound is $3\ \mu m \leq Dv50 \leq 12\ \mu m$.

Based on this, the average particle size Dv50 can be selected to be 2 μm or more, or the average particle size Dv50 can be selected to be 3 μm or more, which can reduce the film-forming consumption of active ions on the negative electrode and reduce the side reactions of the electrolyte on the negative electrode, thereby reducing irreversible capacity of the secondary battery and improving the cycle performance of the secondary battery. It can also reduce the amount of binder added in the negative electrode plate, which is beneficial to increasing the energy density of the secondary battery.

Based on this, the average particle size Dv50 can be 15 μm or less, or the average particle size Dv50 can be 12 μm or less, so that the migration path of active ions and electrons in the silicon-oxygen compound particles is shorter, and that the migration rate of ions and electrons is improved, thereby improving the dynamic performance of the secondary battery. It is also beneficial to preventing the negative electrode material from cracking during charge and discharge process, thereby improving the cycle performance of the secondary battery.

In some embodiments, optionally, the specific surface area of the silicon-oxygen compound is 1 $m^2/g$~7 $m^2/g$; or optionally, the specific surface area of the silicon-oxygen compound is 2 $m^2/g$~6 $m^2/g$.

Based on this, the specific surface area can be 1 $m^2/g$ or more; or the specific surface area can be 2 $m^2/g$ or more, which can make the surface of the silicon-oxygen compound particles have more active sites and can effectively improve the electrochemical performance of the negative electrode material to meet the requirements of secondary batteries for dynamic performance. Optionally, the specific surface area can be 7 $m^2/g$ or less, or the specific surface area can be 6 $m^2/g$ or less, which is beneficial to reducing the side reaction of the electrolyte on the negative electrode, and can also reduce the film-forming consumption of active ions on the negative electrode, thereby reducing the irreversible capacity of the secondary battery and improving the cycle performance of the secondary battery.

In some embodiments, optionally, the silicon-oxygen compound has a compacted density of 1.2 $g/cm^3$~1.7 $g/cm^3$ as measured under a pressure of 5 tons (equivalent to 49 KN); or optionally, the silicon-oxygen compound has a compacted density of 1.3 $g/cm^3$~1.6 $g/cm^3$ measured under a pressure of 5 tons. If the compacted density is within the above range, higher specific capacity and energy density can be obtained.

The content of sulfur element and aluminum element in the silicon-oxygen compound of the present application can be determined by instruments and methods known in the art. For example, refer to EPA-3052-1996 "Microwave Assisted Acid Digestion of Silicates" to digest the negative electrode material, and then use an inductively coupled plasma emission spectrometer (ICP-OES, Type: ICAP-7000) from Thermo Fisher Scientific Company in accordance with EPA 6010D-2014 "Inductively Coupled Plasma Atomic Emission Spectrometry" (Thermo Fisher Scientific) to determine the content of sulfur element and aluminum element. The specific test method is as follows: using 10 mL nitric acid and 10 mL hydrofluoric acid to digest 0.5 g of silicon-oxygen compound sample by microwave, adding it to 50 mL volumetric flask after digestion, and then using ICAP-7000 ICP-OES to determine the content of sulfur element and aluminum element.

The X-ray diffraction spectrum of the negative electrode material of the present application can be measured by instruments and methods well known in the art. For example, an X-ray powder diffractometer is used to measure the X-ray diffraction spectrum in accordance with JIS K0131-1996 (General rules for X-ray diffractometric analysis). For another example, an X-ray diffractometer (Type: Bruker D8 Discover) from Bruker AxS, Germany is used, wherein $CuK_\alpha$ rays is used as the radiation source, the ray wavelength is $\lambda=1.5406$ Å, the scanning angle range for 2θ is from 10°~90°, and the scanning rate is 4°/min.

The powder volume resistivity of the silicon-oxygen compound under a pressure of 20 MPa can be measured by a known test method for powder volume resistivity. As an example, the four-probe method is used to test the powder volume resistivity of the negative electrode material of this application under a pressure of 20 MPa. The test method includes: adding the powder of the negative electrode material of the present application to a sample table, and applying a pressure of 20 MPa to the powder through a press, after the pressure is stable, reading the volume resistivity of the negative electrode material under the pressure of 20 MPa via a resistivity meter.

The average particle size Dv50 has a well-known meaning in the art, and can be measured with a well-known instrument and method in the art. For example, the measurement can be made by using a laser particle size analyzer for easy determination, such as the Mastersizer 2000E-typed laser particle size analyzer from Malvern Instruments Co., Ltd., UK according to GB/T 19077-2016 (Particle Size Distribution-Laser Diffraction Methods).

The specific surface area has a well-known meaning in the art, and it can be measured by instruments and methods known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

The compacted density can be measured with instruments and methods known in the art. For example, with reference to GB/T24533-2009 standard, it can be measured by an electronic pressure testing machine, such as UTM7305 electronic pressure testing machine. Accurately weigh about 1 g of the sample, add it to a mold with a bottom area of 1.327 $cm^2$, apply a pressure of 5 tons to the sample with a pressurizing device and keep it under this pressure for 30 seconds before releasing the pressure, and then measure the height of the sample to pass. The compacted density of the silicon-oxygen compound can be obtained from the following formula: $\rho=m/(1.327*h)$, where $\rho$ represents the compacted density of the silicon-oxygen compound, m represents the mass of the sample, and h represents the height of the sample after being applied with a pressure of 5 tons and held at this pressure for 30 seconds before releasing the pressure.

In some aspects, a method for preparing a silicon-oxygen compound is also provided, which includes the following steps:

S10: providing raw materials, heating the raw materials in an inert atmosphere under normal pressure or reduced pressure to generate gas;

S20: cooling the gas in an inert atmosphere under normal pressure or reduced pressure, and depositing the gas to obtain the silicon-oxygen compound of the first aspect of the present application.

Optionally, the raw materials comprise silicon monoxide powder, sulfur source, and optionally added aluminum source.

Optionally, the raw materials comprise metallic silicon powder and silicon dioxide powder, sulfur source, and optionally added aluminum source.

Optionally, the raw materials comprise silicon monoxide powder, metallic silicon powder and silicon dioxide powder, sulfur source, and optionally added aluminum source.

Optionally, the sulfur element in the silicon-oxygen compound may be derived from the sulfur source in the above mixture.

Optionally, the aluminum element in the silicon-oxygen compound may be derived from silicon monoxide powder and/or metallic silicon powder, and may also be derived from the aluminum source in the aforementioned raw materials.

In some embodiments, the content of sulfur element in the silicon-oxygen compound of the present application can be controlled by adjusting the type and amount of sulfur source; and the content of aluminum element in the silicon-oxygen compound of the present application can be controlled by one or more of the following means: by selecting the silicon-oxygen powder or metallic silicon powder with different content of aluminum element, by adjusting the types and the amount of the aluminum source, so that the content of sulfur element is from 20 ppm to 300 ppm, and the mass ratio of sulfur element to aluminum element is from 1.5 to 13.0.

Optionally, the sulfur source may be selected from one or more of high-sulfur coke, elemental sulfur, metal sulfide, sulfate, and polysulfide.

Optionally, the aluminum source may be selected from one or more of metallic aluminum, aluminum alloys, and aluminum compounds, aluminum oxides, aluminum sulfides, and aluminum hydroxides.

In some embodiments, in the above preparation method, in step S10, the inert atmosphere may be a nitrogen atmosphere, an argon atmosphere, a helium atmosphere, or the like. The pressure of the inert atmosphere is normal pressure or reduced pressure, and optionally, the absolute pressure of the inert atmosphere is from 10 Pa to 1 kPa; or optionally, the absolute pressure of the inert atmosphere is from 20 Pa to 50 Pa. The temperature for heating raw materials to generate gas can be 1100° C.~1600° C.

In some embodiments, within the above heating temperature range, the temperature is elevated, and the elevated temperature can increase the content of sulfur and aluminum element in the finally obtained silicon-oxygen compound.

In some embodiments, within the above-mentioned inert atmosphere pressure range, the pressure is reduced, i.e., the vacuum degree is increased, and the reduced pressure can increase the content of sulfur and aluminum element in the finally obtained silicon-oxygen compound.

In some embodiments, in the above preparation method, in step S20, the inert atmosphere may be a nitrogen atmosphere, an argon atmosphere, a helium atmosphere, or the like. The pressure of the inert atmosphere is normal pressure or reduced pressure, and optionally, the absolute pressure of the inert atmosphere is from 10 Pa to 1 kPa; or optionally, the absolute pressure of the inert atmosphere is from 20 Pa to 50 Pa.

In some embodiments, in the above preparation method, in step S20, the gas is cooled to a deposition temperature so that the gas is deposited to form a solid. The silicon-oxygen compound can obtain an appropriate crystal structure by adjusting the deposition temperature and the like. Optionally, the deposition temperature is 800° C.~1000° C., which is conducive to obtaining better crystallite size and suitable crystallinity of the silicon-oxygen compound, so that the silicon-oxygen compound has higher initial coulombic efficiency and cycle performance.

In some embodiments, in the above preparation method, after step S20, an optional step S30 is further included to crush the obtained deposits to obtain a silicon-oxygen compound with the above particle size distribution and specific surface area.

In some embodiments, in step S30, any method and equipment known in the art can be used to crush the deposit, such as a grinder. For another example, the deposit is ground in a planetary ball mill for a certain period of time to obtain the silicon-oxygen compound of the present application.

In some embodiments, in the above preparation method, after step S30, an optional step S40 is further included to surface-coat the particulates obtained in step S30.

In some embodiments, in step S40, a chemical vapor deposition method may be used to coat the surface of the particulates to form a coating layer. For example, a gas of hydrocarbon compound is introduced into a reaction furnace containing the particulates, and heat treatment is performed under an inert atmosphere to carbonize the hydrocarbon compound to form a coating layer covering the surface of the particulates to obtain a silicon-oxygen compound with a carbon coating layer on the surface.

In some embodiments, a liquid phase coating method can also be used to coat the surface of the particles to form a coating layer. For example, the method comprises dissolving a polymer in a certain solvent, stirring vigorously with the silicon-oxygen particles until homogeneously mixed, evaporating the solvent to remove it, and then performing heat treatment at a certain temperature, such as 200° C.~600° C., to make the polymer evenly coated on the surface of silicon-oxygen particles.

In some aspects, the use of a silicon-oxygen compound as a negative active material is provided, such as the use as the negative active material for a secondary battery, for example, the use as the negative active material for a lithium ion secondary battery.

Secondary Battery

The second aspect of embodiments of the present application provides a secondary battery comprising the above-mentioned silicon-oxygen compound.

Specifically, the secondary battery comprises a positive electrode plate, a negative electrode plate, a separator, and an electrolyte. The negative electrode comprises a negative electrode current collector and a negative electrode film disposed on at least one surface of the negative electrode current collector, wherein the negative electrode film comprises a negative active material comprising the above-mentioned silicon-oxygen compound.

In the secondary battery, the negative electrode current collector can be made of a material with good conductivity and mechanical strength, and optionally it can be copper foil.

In the secondary battery, furthermore, the negative active material may optionally comprise one or more of graphite, hard carbon, and soft carbon; optionally, the negative active material may also comprise graphite, which can be selected from one or more of artificial graphite and natural graphite.

In the secondary battery, furthermore, the negative electrode film may optionally comprise a conductive agent, a binder, and a thickener, and there is no specific limitation on their types, and those skilled in the art can make selections according to actual needs.

Optionally, the conductive agent used for the negative electrode film can be one or more of graphite, superconducting carbon, acetylene black, carbon black, Ketjen black, carbon dots, carbon nanotubes, graphene, and carbon nanofibers. The binder can be one or more of polyacrylic acid (PAA), sodium polyacrylate (PAAS), polyvinyl alcohol (PVA), styrene butadiene rubber (SBR), sodium carboxymethyl cellulose (CMC), sodium alginate (SA), polymethacrylic acid (PMAA) and carboxymethyl chitosan (CMCS). The thickener can be sodium carboxymethyl cellulose (CMC).

The negative electrode plate can be prepared according to conventional methods in the art. For example, the silicon-oxygen compound and optional conductive agent, binder and thickener are dispersed in a solvent which can be deionized water to form a uniform negative electrode slurry. The negative electrode slurry is coated on the negative electrode current collector. After being dried, cold pressed and other processes, a negative electrode plate is obtained.

In the secondary battery, the positive electrode plate comprises a positive electrode current collector and a positive electrode film disposed on at least one surface of the positive electrode current collector and comprising a positive active material.

In the secondary battery, the positive electrode current collector can be made of materials with good electrical conductivity and mechanical strength, and optionally it can be aluminum foil.

In the secondary battery, the type of the positive active material is not specifically limited, and materials capable of reversibly deintercalating active ions can be used, and those skilled in the art can make selections according to actual needs. Optionally, the positive active material may be selected from lithium transition metal oxides and modified materials thereof, and the modified material may be lithium transition metal oxide subjected to doping modification and/or coating modification. Optionally, the lithium transition metal oxide can be selected from one or more of lithium cobalt oxide, lithium nickel oxide, lithium manganese oxide, lithium nickel manganese oxide, lithium nickel cobalt manganese oxide, and lithium nickel cobalt aluminum oxide.

In the secondary battery, the positive electrode film may also comprise a binder and/or a conductive agent. The types of the binder and the conductive agent are not specifically limited, and those skilled in the art can make selections according to actual needs. Optionally, the binder used for the positive electrode film may comprise one or more of polyvinylidene fluoride (PVDF) and polytetrafluoroethylene (PTFE); the conductive agent may comprise one or more of graphite, superconducting carbon, acetylene black, carbon black, Ketjen black, carbon dots, carbon nanotubes, graphene, and carbon nanofibers.

The above-mentioned positive electrode plate can be prepared according to conventional methods in the art. For example, the positive active material and optionally conductive agent and binder are dispersed in a solvent which can be N-methylpyrrolidone, or NMP for short, to form a uniform positive electrode slurry, and the positive electrode slurry is coated on the positive electrode current collector. After being dried, cold pressed and other processes, the positive electrode plate is obtained.

In the secondary battery, there is no specific limitation on the type of electrolyte, and it can be selected according to requirements. The electrolyte may be selected from at least one of solid electrolyte and liquid electrolyte (i.e. an electrolytic solution). When the electrolyte is an electrolytic solution, the electrolytic solution comprises an electrolyte salt and a solvent.

Optionally, the electrolyte salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

Optionally, the solvent may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

The electrolytic solution may optionally comprise an additive. The additive is not particularly limited and can be selected according to requirements. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

In the secondary battery, the separator serves to isolate the positive electrode plate and the negative electrode plate. The separator is not particularly limited, and any well-known porous structure separator having electrochemical stability and mechanical stability can be selected, such as one or more of glass fiber, non-woven fabric, polyethylene, polypropylene and polyvinylidene fluoride. The separator can be a single-layer film or a multilayer composite film. When the separator is a multilayer composite film, the materials of each layer may be the same or different.

The secondary battery can be prepared by a method known in the art. As an example, a positive electrode plate, a separator, and a negative electrode plate are wound or stacked in order, so that the separator is located between the positive electrode plate and the negative electrode plate to play a role of isolation, as such to obtain a battery core. The battery core is placed in a packaging case, and then an electrolyte is injected and sealed to obtain a secondary battery.

In the secondary battery of the present application, the separator is arranged between the positive electrode plate and the negative electrode plate to play a role of isolation. The separator is not particularly limited, and any conventional separator for battery can be used, such as polyethylene, polypropylene, polyvinylidene fluoride and their multilayer composite film, but not limited to these.

In the secondary battery of the present application, the type of electrolyte is not specifically limited. The electrolyte may be a liquid electrolyte, which is also called an electrolytic solution, and the electrolyte may also be a solid electrolyte. Optionally, a liquid electrolyte is used as the electrolyte, wherein the liquid electrolyte may comprise an electrolyte salt and an organic solvent. The specific types of electrolyte salt and organic solvent are not particularly limited and can be selected according to actual requirements. The electrolyte may further comprise an additive. The types of additive are not particularly limited. The additive may be negative electrode film-forming additives, positive electrode film-forming additives, or additives that can improve certain performance of the battery, such as additives that improve overcharge performance of the battery, additives that improve high-temperature performance of the battery, and those that improve low-temperature performance of the battery.

In some embodiments, the secondary battery may comprise an outer packaging. The outer packaging is used to encapsulate the positive electrode plate, the negative electrode plate and the electrolyte.

In some embodiments, the outer packaging of the secondary battery may be a hard case, such as a hard plastic case, an aluminum case, or a steel case. The outer packaging of the battery may also be a soft bag, such as a bag-type soft bag. The material of the soft bag can be plastic, such as one or more of polypropylene (PP), polybutylene terephthalate (PBT), polybutylene succinate (PBS).

The secondary battery of the present application can be prepared by a method known in the art. For example, the positive electrode plate, the separator, and the negative electrode plate are formed into an electrode assembly through a winding process or a lamination process, wherein the separator is located between the positive electrode plate and the negative electrode plate to play a role of isolation; the electrode assembly is placed in a packaging case, then the electrolyte is injected and sealed to obtain a battery.

Figure 3:
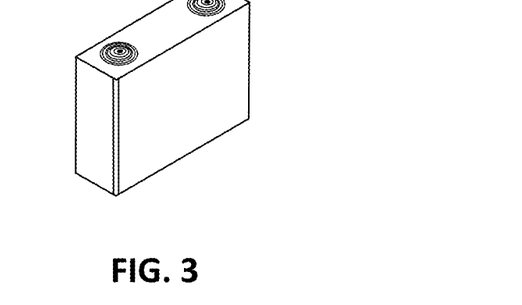
FIG. 3 is a perspective view of an embodiment of a battery.

The present application has no particular limitation on the shape of the secondary battery, which may be cylindrical, square or any other shapes. FIG. 3 shows a battery 5 with a square structure as an example.

Figure 4:
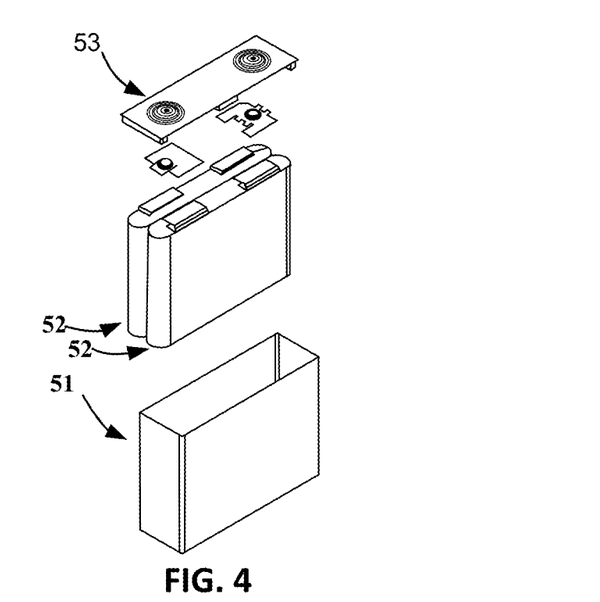
FIG. 4 is an exploded view of FIG. 3.

In some embodiments, referring to FIG. 4, the outer package may comprise a housing 51 and a cover 53. Wherein, the housing 51 may comprise a bottom plate and a side plate connected to the bottom plate, and the bottom plate and the side plate enclose a receiving cavity. The housing 51 has an opening communicating with the receiving cavity, and the cover plate 53 can cover the opening to close the receiving cavity. A positive electrode plate, a negative electrode plate and a separator may be formed into an electrode assembly 52 through a winding process or a lamination process. The electrode assembly 52 is packaged in the receiving cavity. The electrolyte is infiltrated in the electrode assembly 52. The number of electrode assemblies 52 contained in the battery 5 can be one or more, which can be adjusted according to requirements.

The third aspect of the present application provides a battery module. The secondary battery provided in the second aspect of the present application can be assembled to form the battery module of the third aspect. The number of batteries contained in the battery module can be multiple, and the specific number can be adjusted according to the application and capacity of the battery module.

Figure 5:
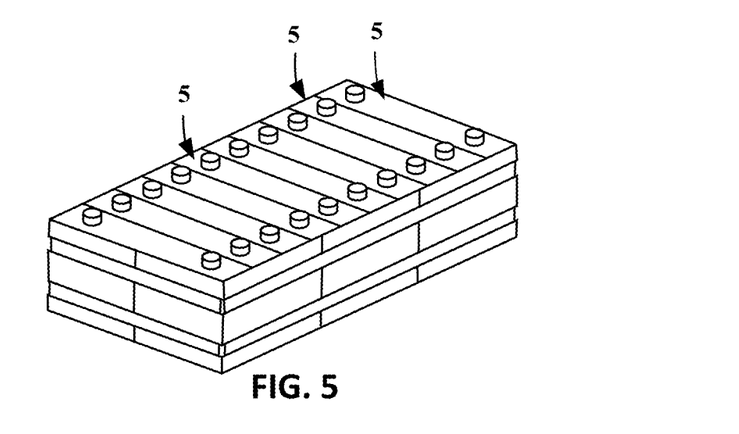
FIG. 5 is a perspective view of an embodiment of a battery module.

FIG. 5 is a battery module 4 as an example. Referring to FIG. 5, in the battery module 4, a plurality of batteries 5 may be arranged in sequence along the length direction of the battery module 4. Of course, it can also be arranged in any other manner. Further, the plurality of batteries 5 can be fixed by fasteners.

Optionally, the battery module 4 may further comprise a housing with a receiving space, and a plurality of batteries 5 are accommodated in the receiving space.

The fourth aspect of the present application provides a battery pack. The battery module provided in the third aspect of the present application can also be assembled into the battery pack. The number of battery modules contained in the battery pack can be adjusted according to the application and capacity of the battery pack.

Figure 6:
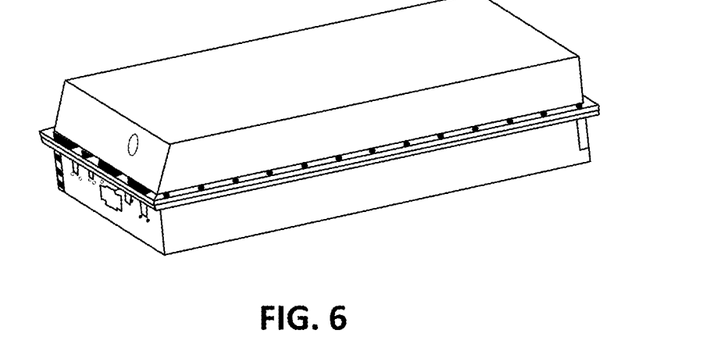
FIG. 6 is a perspective view of an embodiment of a battery pack.
Figure 7:
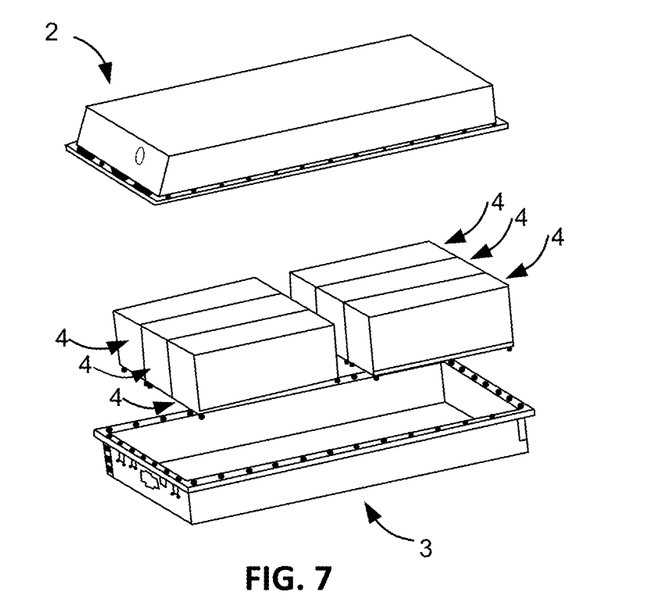
FIG. 7 is an exploded view of FIG. 6.

FIGS. 6 and 7 are the battery pack 1 as an example. Referring to FIGS. 6 and 7, the battery pack 1 may comprise a battery case and a plurality of battery modules 4 provided in the battery case. The battery case includes an upper case 2 and a lower case 3. The upper box case 2 can be covered on the lower case 3 and forms a closed space for accommodating the battery module 4. Multiple battery modules 4 can be arranged in the battery box in any manner.

A fifth aspect of the present application provides a device including at least one of the secondary battery, battery module, or battery pack of the present application. The secondary battery, battery module or battery pack can be used as a power source of the device, and can also be used as an energy storage unit of the device. The device can be, but is not limited to, mobile devices (such as mobile phones, notebook computers), electric vehicles (such as pure electric vehicles, hybrid electric vehicles, plug-in hybrid electric vehicles, electric bicycles, electric scooters, electric golf carts, electric trucks), electric trains, ships and satellites, energy storage systems, etc.

The device can be selected as a secondary battery, a battery module, or a battery pack according to its usage requirements.

Figure 8:
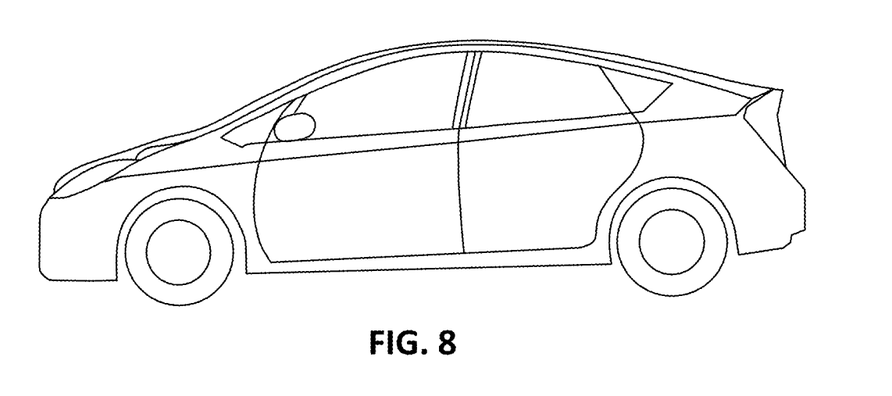
FIG. 8 is a schematic view showing an embodiment of a device.

FIG. 8 is a device as an example. The device is a pure electric vehicle, a hybrid electric vehicle, or a plug-in hybrid electric vehicle. In order to meet the requirements of the device for high power and high energy density of the secondary battery, a battery pack or a battery module can be used.

As another example, the device may be a mobile phone, a tablet computer, a notebook computer, etc. The device is generally required to be thin and light, and a secondary battery can be used as a power source.

Explanation of Terms

"Normal pressure" refers to a standard atmospheric pressure, i.e., 101.325 kPa.

"Reduced pressure" means less than one standard atmosphere.

The silicon-oxygen compound $SiO_x$ is a non-stoichiometric compound.

EXAMPLE

The following examples are intended to describe the disclosure of the present application, and are intended to be illustrative only, and various modifications and changes in the scope of the present disclosure will be apparent to those skilled in the art. All parts, percentages, and ratios reported in the following examples are by weight unless otherwise stated, and all reagents used in the examples are commercially available or synthetically obtained by conventional methods and are directly used without further processing, and the instruments used in the examples are commercially available.

Example 1

Preparation of Silicon-Oxygen Compound 1) 22.7 g of metallic silicon 1 in powder (a purified metallic silicon product, content of silicon element≥99.9%, content of aluminum element≤100 ppm, content of iron element≥100 ppm, content of calcium element≤100 ppm), 27.3 g of metallic silicon 2 in powder (content of silicon element≥99.7%, content of aluminum element≤1000 ppm, content of iron element≤1000 ppm, content of calcium element≤100 ppm), 50 g of silicon dioxide powder and 0.81 g of high-sulfur coke powder containing 2.5 wt % of sulfur were mixed to obtain the raw material. The content of sulfur element was 201 ppm, and the content of aluminum element was 293 ppm. In the raw materials of this embodiment, the sulfur element was derived from high-sulfur coke; the aluminum element was derived from metallic silicon 1 and metallic silicon 2, and no aluminum source was added.

2) In a closed container with an evacuating device, the raw materials was heated at a temperature of 1300° C. in a helium atmosphere with an absolute pressure of 30 Pa to generate gas which contained silicon, oxygen, aluminum and sulfur element.

3) In a closed container with a vacuum device, in a helium atmosphere with an absolute pressure of 30 Pa, the gas was cooled at a temperature of 950° C. to deposit the gas, and the deposit was crushed to obtain a silicon-oxygen compound.

Examples 2 to 17 and Comparative Examples 1 to 4

Different from Example 1, the relevant parameters in the preparation process of the silicon-oxygen compound, such as the type and amount of sulfur source and aluminum source, were adjusted to obtain the corresponding silicon-oxygen compound. See Table 1 for details.

Among them, the metallic silicon 3 satisfied: the content of silicon element was greater than or equal to 98.5%, the content of aluminum element was less than or equal to 5000 ppm, the content of iron element was less than or equal to 5000 ppm, and the content of calcium element was less than or equal to 3000 ppm.

Preparation of Negative Electrode Plate

The resulting silicon-oxygen compound, a conductive agent Super-P (conductive carbon black), and a binder PAA (polyacrylic acid) were mixed at a mass ratio of 85:5:10 in an appropriate amount of deionized water to obtain a homogeneous negative electrode slurry; the negative electrode slurry was coated on the surface of the negative electrode current collector copper foil, dried and cold pressed to obtain a negative electrode plate.

Counter Electrode: Metal Lithium Sheet.

Separator: Polyethylene (PE) Film.

Electrolyte: ethylene carbonate (EC), ethyl methyl carbonate (EMC), and diethyl carbonate (DEC) were mixed in a volume ratio of 1:1:1, and fluoroethylene carbonate (FEC) was added, and then $LiPF_6$ was uniformly dissolved in the mixture of the solvents to obtain an electrolytic solution, in which the concentration of $LiPF_6$ was 1 mol/L, and the mass percentage of FEC was 6%.

Preparation of Button Battery

The above-mentioned negative electrode plate, separator, metal lithium piece and counter electrode were laminated in order, and the above-mentioned electrolyte was added to obtain a button battery.

Test for the Composition and Particle Size

The compositions of the silicon-oxygen compounds of Examples 1 to 17 and Comparative Examples 1 to 4 were analyzed, wherein the contents of sulfur element and aluminum element were analyzed. The results were shown in Table 2.

The particle sizes of the silicon-oxygen compounds of Examples 1 to 17 and Comparative Examples 1 to 4 were analyzed, wherein the particle size DV50 was analyzed. The results were shown in Table 2.

Test for Capacity Performance and Cycle Performance of Button Battery

Under a normal pressure environment at 25° C. a button battery was discharged at a constant current rate of 0.1 C to 0.005V, and then discharged at a constant current of 0.04 C to 0.005V, and then was left for 5 minutes. The resulting discharge capacity was recorded as the lithiation capacity for the first cycle. After that, the battery was charged to 1.5V at a constant current rate of 0.1 C, and then was allowed to stand for 5 minutes. This procedure formed a charge and discharge cycle. The resulting charge capacity was recorded as the delithiation capacity for the first cycle. The button battery was subjected to 30 cycles of charge-discharge test following the procedure described above, and the delithiation capacity for each cycle was recorded.

The initial coulombic efficiency of button battery (%)=delithiation capacity for the first cycle/the lithiation capacity for the first cycle×100%

Cycle capacity retention rate of button battery (%)=delithiation capacity for the 30$^{th}$ cycle/the lithiation capacity for the first cycle×100%

The test results of Examples 1 to 17 and Comparative Examples 1 to 4 were shown in Table 2.

From the data in Table 2, it can be seen that the initial coulombic efficiency and the capacity retention rate after cycling of the batteries of Examples 1 to 17 were significantly improved compared to the batteries of Comparative Examples 1 to 4.

The content of sulfur element in Comparative Example 1 was too high, on the one hand, it reduced the gram capacity of the silicon-oxygen compound. On the other hand, too much lithium-sulfur compound was generated during the lithiation process, which would cause excessive consumption of active lithium ions in the secondary battery, thereby reducing the initial efficiency and cycle performance of the silicon-oxygen compound. The content of sulfur element in Comparative Example 2 was too low, and the buffering effect on the expansion and contraction of the particles was insufficient, so that the particles were more likely to crack during the charge and discharge process, which also lead to low initial coulombic efficiency and poor cycle performance.

The mass ratio of sulfur element to aluminum element of Comparative Example 3 and Comparative Example 4 was too low or too high, the sulfur element and aluminum element cannot achieve a good synergistic effect, and the ion transport performance of the silicon-oxygen compound was poorly matched with the electron transport performance. As a result, the initial efficiency and cycle performance of the silicon-oxygen compound were poor.

Figure 1:
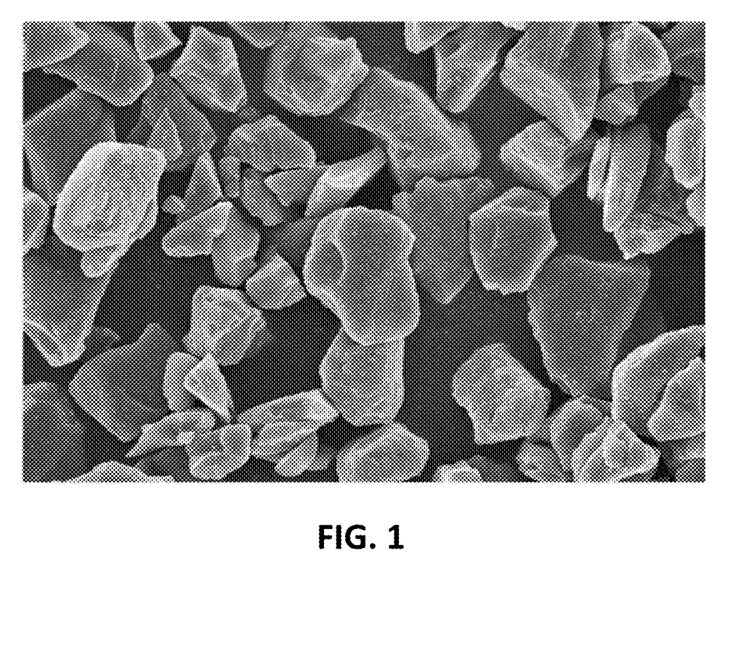
FIG. 1 is an SEM image (Scanning Electron Microscope) of an embodiment of the negative active material of the present application.
Figure 2:
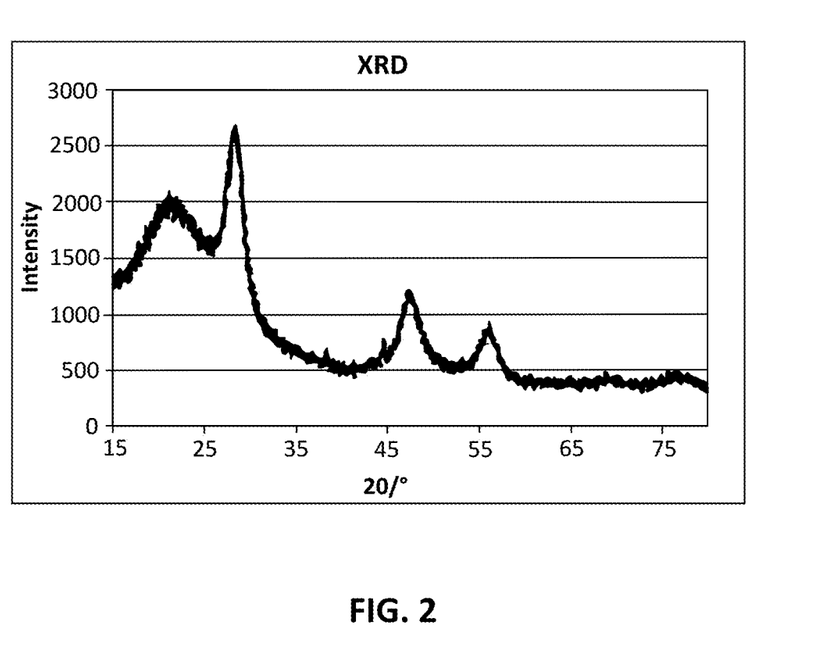
FIG. 2 is an X-ray diffraction pattern of a silicon-oxygen compound according to an embodiment of the present application.

The X-ray diffraction pattern of the silicon-oxygen compound of Example 6 was shown in FIG. 1. The silicon-oxygen compound had a diffraction peak at a position where the diffraction angle 2θ was 26°~30°, and the full width at half maxima of the diffraction peak was 0.8°~3.2°; it had a diffraction at a position where the diffraction angle 2θ was 46°~50°, and the full width at half maxima of the diffraction peak was 1.0°~4.2°; it had a diffraction peak at the position where the diffraction angle 2θ was 54°~58°, and the full width at half maxima of the diffraction peak was 0.8°~4.5°.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

TABLE 1

| | | Raw materials | | | | | | | | Contents of S and Al after mixing | |
|---|---|---|---|---|---|---|---|---|---|---|---|
| | | Metallic silicon 1 | Metallic silicon 2 | Metallic silicon 3 | Silicon dioxide | Sulfur source | | Aluminum source | | | |
| No. | | Amount (g) | amount (g) | amount (g) | amount (g) | Type | Amount (g) | Type | Amount (g) | Content of S (ppm) | Content of Al (ppm) |
| Example | 1 | 22.7 | 27.3 | / | 50.0 | high-sulfur coke | 0.81 | / | / | 201 | 293 |
| | 2 | 18.4 | 31.6 | / | 50.0 | high-sulfur coke | 1.22 | / | / | 301 | 330 |
| | 3 | / | 18.5 | 31.5 | 50.0 | high-sulfur coke | 6.39 | / | / | 1502 | 1654 |
| | 4 | / | 1.4 | 48.6 | 50.0 | high-sulfur coke | 11.11 | / | / | 2500 | 2200 |
| | 5 | / | 37.4 | 12.6 | 50.0 | high-sulfur coke | 6.39 | / | / | 1502 | 944 |
| | 6 | 4.6 | 45.4 | / | 50.0 | high-sulfur coke | 4.17 | / | / | 1001 | 440 |
| | 7 | / | 45.4 | 4.6 | 50.0 | high-sulfur coke | 8.70 | / | / | 2001 | 629 |
| | 8 | / | 46.7 | 3.3 | 50.0 | high-sulfur coke | 11.11 | / | / | 2500 | 569 |
| | 9 | 44.2 | 5.8 | / | 50.0 | high-sulfur coke | 2.04 | / | / | 500 | 100 |
| | 10 | / | 48.1 | 1.9 | 50.0 | high-sulfur coke | 13.64 | / | / | 3001 | 507 |
| | 11 | 4.6 | 45.4 | / | 50.0 | high-sulfur coke | 4.17 | / | / | 1001 | 440 |
| | 12 | 4.6 | 45.4 | / | 50.0 | high-sulfur coke | 4.17 | / | / | 1001 | 440 |
| | 13 | 4.6 | 45.4 | / | 50.0 | high-sulfur coke | 4.17 | / | / | 1001 | 440 |
| | 14 | 4.6 | 45.4 | / | 50.0 | high-sulfur coke | 4.17 | / | / | 1001 | 440 |
| | 15 | 4.6 | 45.4 | / | 50.0 | high-sulfur coke | 4.17 | / | / | 1001 | 440 |
| | 16 | 9.4 | 40.6 | / | 50.0 | Sulfur powder | 0.30 | / | / | 2991 | 414 |
| | 17 | / | 50.0 | / | 50.0 | high-sulfur coke | 11.11 | Al powder | 0.084 | 2498 | 1205 |
| Comparative example | 1 | / | 18.5 | 31.5 | 50.0 | high-sulfur coke | 16.01 | / | / | 3450 | 1517 |
| | 2 | 43.3 | 6.7 | / | 50.0 | high-sulfur coke | 0.40 | / | / | 100 | 110 |
| | 3 | / | 29.1 | 20.9 | 50.0 | high-sulfur coke | 1.22 | / | / | 301 | 1320 |
| | 4 | 27.8 | 22.2 | / | 50.0 | high-sulfur coke | 9.99 | / | / | 2271 | 227 |

TABLE 2

| | | Silicon-oxygen compound | | | | Performance of battery | |
|---|---|---|---|---|---|---|---|
| No. | | Content of S (ppm) | Content of Al (ppm) | Mass ratio of S to Al | $D_v50$ (μm) | Initial coulombic efficiency (%) | Capacity retention rate after 30 cycles (%) |
| Example | 1 | 20 | 13 | 1.5 | 6 | 73.5 | 91.1 |
| | 2 | 30 | 15 | 2.0 | 6 | 78.3 | 95.0 |
| | 3 | 150 | 75 | 2.0 | 6 | 77.9 | 94.7 |
| | 4 | 250 | 100 | 2.5 | 6 | 77.0 | 93.7 |
| | 5 | 150 | 43 | 3.5 | 6 | 78.3 | 94.7 |
| | 6 | 98 | 19 | 5.2 | 6 | 79.0 | 95.5 |
| | 7 | 202 | 29 | 7.0 | 6 | 78.4 | 93.9 |
| | 8 | 250 | 26 | 9.6 | 6 | 77.7 | 94.2 |
| | 9 | 51 | 5 | 10.2 | 6 | 74.1 | 90.3 |
| | 10 | 300 | 23 | 13.0 | 6 | 72.5 | 89.8 |
| | 11 | 98 | 19 | 5.2 | 3 | 75.6 | 92.7 |
| | 12 | 98 | 19 | 5.2 | 4 | 78.1 | 94.3 |
| | 13 | 98 | 19 | 5.2 | 8 | 78.9 | 94.7 |
| | 14 | 98 | 19 | 5.2 | 9 | 78.9 | 94.3 |
| | 15 | 98 | 19 | 5.2 | 12 | 76.2 | 89.3 |
| | 16 | 98 | 19 | 5.2 | 6 | 78.6 | 94.8 |

TABLE 2-continued

|  | No. | Silicon-oxygen compound | | | | Performance of battery | |
|---|---|---|---|---|---|---|---|
|  |  | Content of S (ppm) | Content of Al (ppm) | Mass ratio of S to Al | $D_v50$ (μm) | Initial coulombic efficiency (%) | Capacity retention rate after 30 cycles (%) |
|  | 17 | 250 | 48 | 5.2 | 6 | 78.2 | 94.9 |
| Comparative example | 1 | 350 | 70 | 5.0 | 6 | 68.6 | 81.1 |
|  | 2 | 9 | 5 | 1.8 | 6 | 59.3 | 76.5 |
|  | 3 | 30 | 60 | 0.5 | 6 | 70.6 | 82.6 |
|  | 4 | 227 | 10 | 22.7 | 6 | 64.7 | 80.8 |

What is claimed is:

1. A secondary battery comprising: a positive electrode plate, a negative electrode plate, a separator, and an electrolyte, wherein the negative electrode comprises a negative electrode current collector and a negative electrode film disposed on at least one surface of the negative electrode current collector, the negative electrode film comprises a negative active material comprising a silicon-oxygen compound, wherein the silicon-oxygen compound has a formula of $SiO_x$, in which $0<x<2$, the silicon-oxygen compound has an average particle diameter Dv50 of 3 μm to 12 μm, a specific surface area from 1 $m^2$/g to 7 $m^2$/g, a compacted density measured under a pressure of 5 tons of 1.2 g/$cm^3$ to 1.7 g/$cm^3$, and the silicon-oxygen compound contains both sulfur and aluminum element, and a content of the sulfur element is 20 ppm to 300 ppm; a content of the aluminum element is from 5 ppm to 150 ppm; and a mass ratio of the sulfur element to the aluminum element is from 1.5 to 13.0.

2. The secondary battery according to claim 1, wherein the content of the sulfur element is from 30 ppm to 250 ppm.

3. The secondary battery according to claim 1, wherein the content of the aluminum element is from 5 ppm to 45 ppm.

4. The secondary battery according to claim 1, wherein the mass ratio of the sulfur element to the aluminum element is from 2.0 to 10.0.

5. The secondary battery according to claim 1, wherein an X-ray diffraction pattern of the silicon-oxygen compound has:
a diffraction peak at a position where the diffraction angle 2θ is 26°-30°, and the full width at half maxima of the diffraction peak is 0.8°-3.2°;
a diffraction peak at a position where the diffraction angle 2θ is 46°-50°, and the full width at half maxima of the diffraction peak is 1.0°-4.2°;
a diffraction peak at a position where the diffraction angle 2θ is 54°-58°, and the full width at half maxima of the diffraction peak is 0.8°-4.5°.

6. The secondary battery according to claim 1, wherein the silicon-oxygen compound has a powder volume resistivity under a pressure of 20 MPa of 10 Ω cm or less.

7. The secondary battery according to claim 1, wherein a coating layer is coated on an outer surface of the silicon-oxygen compound, and the coating layer comprises one or more of a polymer, a carbon material, a metal material, and a metal compound.

8. A silicon-oxygen compound, wherein the silicon-oxygen compound has a formula of $SiO_x$, in which $0<x<2$, the silicon-oxygen compound contains both sulfur and aluminum element, a content of the sulfur element is 20 ppm to 300 ppm, a content of the aluminum element is from 5 ppm to 150 ppm, and a mass ratio of the sulfur element to the aluminum element is from 1.5 to 13.0,
an X-ray diffraction pattern of the silicon-oxygen compound has:
a first diffraction peak at a position where the diffraction angle 2θ is 26°-30°, and the full width at half maxima of the diffraction peak is 0.8°-3.2°;
a second diffraction peak at a position where the diffraction angle 2θ is 46°-50°, and the full width at half maxima of the diffraction peak is 1.0°-4.2°; and
a third diffraction peak at a position where the diffraction angle 2θ is 54°-58°, and the full width at half maxima of the diffraction peak is 0.8°-4.5°.

9. A device comprising at least one of the secondary battery of claim 1.

10. The secondary battery according to claim 1, wherein the content of the aluminum element is from 10 ppm to 100 ppm.

11. The secondary battery according to claim 1, wherein the silicon-oxygen compound has a powder volume resistivity under a pressure of 20 MPa of 1 Ω·cm or less.

12. The secondary battery according to claim 1, wherein the silicon-oxygen compound has a specific surface area from 2 $m^2$/g to 6 $m^2$/g.

13. The secondary battery according to claim 1, wherein the silicon-oxygen compound has a compacted density measured under a pressure of 5 tons (equivalent to 49 KN) of 1.3 g/$cm^3$ to 1.6 g/$cm^3$.

14. The secondary battery according to claim 7, wherein the coating layer comprises one or more of $Ti_5Si_3$, $Al_2O_3$, and $TiO_2$.

15. A silicon-oxygen compound, wherein the silicon-oxygen compound has a formula of $SiO_x$, in which $0<x<2$, the silicon-oxygen compound contains both sulfur and aluminum element, and
an X-ray diffraction pattern of the silicon-oxygen compound has:
a first diffraction peak at a position where the diffraction angle 2θ is 26°-30°, and the full width at half maxima of the diffraction peak is 0.8°-3.2°;
a second diffraction peak at a position where the diffraction angle 2θ is 46°-50°, and the full width at half maxima of the diffraction peak is 1.0°-4.2°; and
a third diffraction peak at a position where the diffraction angle 2θ is 54°-58°, and the full width at half maxima of the diffraction peak is 0.8°-4.5°.

16. The silicon-oxygen compound according to claim 15, wherein the silicon-oxygen compound has an average particle diameter Dv50 of 2 μm to 15 μm.

* * * * *